United States Patent
Kosmowski

(10) Patent No.: US 7,602,562 B2
(45) Date of Patent: Oct. 13, 2009

(54) FLUID COUNTERBALANCE FOR A LASER LENS USED TO SCRIBE AN ELECTRONIC COMPONENT SUBSTRATE

(75) Inventor: Mark Kosmowski, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 31 days.

(21) Appl. No.: 11/751,380

(22) Filed: May 21, 2007

(65) Prior Publication Data

US 2008/0291554 A1 Nov. 27, 2008

(51) Int. Cl.
*G02B 7/02* (2006.01)
(52) U.S. Cl. ...................................... 359/811; 359/823
(58) Field of Classification Search ......... 359/819–826, 359/665, 811
See application file for complete search history.

(56) References Cited

U.S. PATENT DOCUMENTS

| | | | |
|---|---|---|---|
| 3,704,657 A * | 12/1972 | Sliwkowski et al. | .......... 355/55 |
| 4,705,447 A | 11/1987 | Smith | |
| 4,953,671 A * | 9/1990 | Imaizumi | ................. 188/282.3 |
| 5,149,029 A | 9/1992 | Smith | |
| 5,808,272 A | 9/1998 | Sun et al. | |
| 5,949,002 A | 9/1999 | Alden | |
| 5,961,852 A | 10/1999 | Rafla-Yuan et al. | |
| 6,273,110 B1 | 8/2001 | Davis et al. | |
| 6,279,724 B1 | 8/2001 | Davis | |
| 6,405,633 B1 | 6/2002 | Dueckinghaus et al. | |
| 6,723,174 B2 | 4/2004 | Nelson et al. | |
| 6,736,148 B2 | 5/2004 | Davis et al. | |
| 6,942,738 B1 | 9/2005 | Nelson et al. | |
| 6,949,449 B2 | 9/2005 | Swenson et al. | |
| 7,053,011 B2 | 5/2006 | Swenson et al. | |
| 7,084,358 B2 | 8/2006 | Ny et al. | |
| 2004/0000215 A1 * | 1/2004 | Phillips et al. | ................ 74/574 |
| 2005/0042805 A1 | 2/2005 | Swenson et al. | |
| 2006/0215053 A1 * | 9/2006 | Kinoshita | ................... 348/335 |
| 2007/0050075 A1 | 3/2007 | Johnson et al. | |

FOREIGN PATENT DOCUMENTS

| | | |
|---|---|---|
| JP | 2004-167551 A | 6/2004 |
| KR | 20-1999-0040544 U | 12/1999 |
| WO | 2005008849 | 1/2005 |
| WO | 2006088991 | 8/2006 |

* cited by examiner

*Primary Examiner*—Scott J Sugarman
*Assistant Examiner*—Vipin M Patel
(74) *Attorney, Agent, or Firm*—Young Basile

(57) ABSTRACT

An apparatus and method for supporting a device for processing an electronic component substrate includes an assembly supporting a laser lens in a gravity field for focusing movement along a Z-axis by a linear actuator. A fluid counterbalance for the assembly is defined by a piston associated with a housing for movement between end limits of travel. The piston divides the housing into first and second fluid chambers having first and second fluid communication ports. A fluid pressure source is connectable to the first and second chambers through the first and second fluid communication ports. The fluid pressure source is adjustable to statically suspend the supported laser lens in equilibrium within the gravity field. The fluid pressure source permits movement of the supported laser lens to any position between opposite end limits of travel of the piston, while maintaining the mass of the supported laser lens in equilibrium.

20 Claims, 2 Drawing Sheets

FLUID COUNTERBALANCE FOR A LASER LENS USED TO SCRIBE AN ELECTRONIC COMPONENT SUBSTRATE

FIELD OF THE INVENTION

The present invention relates to a fluid counterbalance for a laser lens used to process an electronic component, and more particularly, to a pneumatic counterbalance for a laser lens used to process an electronic component.

BACKGROUND

Current known practice uses a block and tackle, a spring, or a motor, to counter act gravitational forces on a mass, such as a laser lens. All of these solutions have shortcomings. A block and tackle configuration adds considerable mass to the system. If the assembly needs to be moved at high rates of speed and acceleration, additional mass is not desirable due to heat generation and degraded dynamic capabilities. Springs add a negligible amount of mass. However, springs tend to lower the natural frequency of the system dynamics, which at times can cause problems in operating the device in a dynamic environment, especially if the oscillating frequency is close to the natural frequency of the system. The solution to this frequency matching problem is to provide a stiffer spring or a softer spring. The short coming of this solution is that it can cause the drive motor to either push harder against the spring, or act to hold a part of the mass against the gravity field thus heating up the drive motor. The short coming of using a motor for holding up the mass is that the motor begins to heat up due to the continuous current needed to create the force or torque. The additional heat generation causes problems with structures and devices sensitive to heat. It would be desirable to counterbalance a mass in a gravity field without adding a significant amount of mass to the assembly, without generating excessive heat due to continuous current, and/or without lowering the natural frequency of the assembly.

SUMMARY

An apparatus according to an embodiment of the invention counterbalances a mass in a field of gravity without using metal springs, or a block and tackle. A fluid counterbalance apparatus has the ability to automatically or manually vary the natural frequency and damping characteristics of the system. By placing equalizing pressures on either side of a cylinder, a supported mass obtains static equilibrium in a gravity field. The orifice at each port can be adjustable, manually or automatically, to vary the amount of damping in the system. The apparatus counterbalances a mass in a system without adding significant mass to the system, and does not lower the natural frequency of the system. The apparatus allows the natural frequency to be changed by increasing pressure on either side of the cylinder. The damping of the system can also be adjusted by varying the orifice size in the ports on the cylinder. The apparatus counterbalances a spring mass system in a gravity field without adding significant mass or degrading the natural frequency. The apparatus can vary the spring rate of the system by changing the pressures in the cylinder. The apparatus can vary the damping of the system by changing an orifice size on the cylinder ports.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
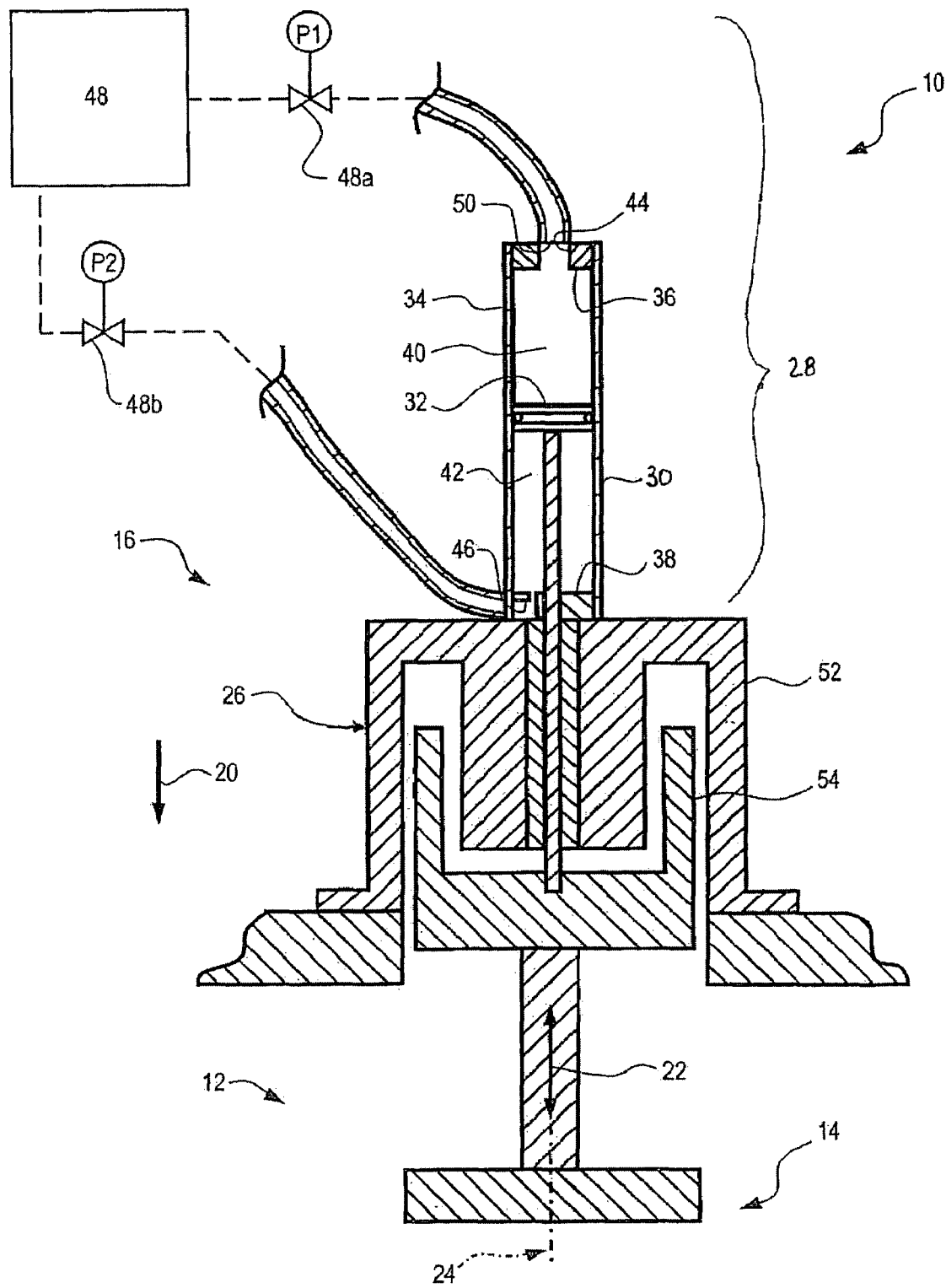
FIG. 1 is a simplified schematic view of a fluid cylinder having a fluid communication port for each chamber defined on either side of a piston moveable within a housing of the fluid cylinder.
Figure 2:
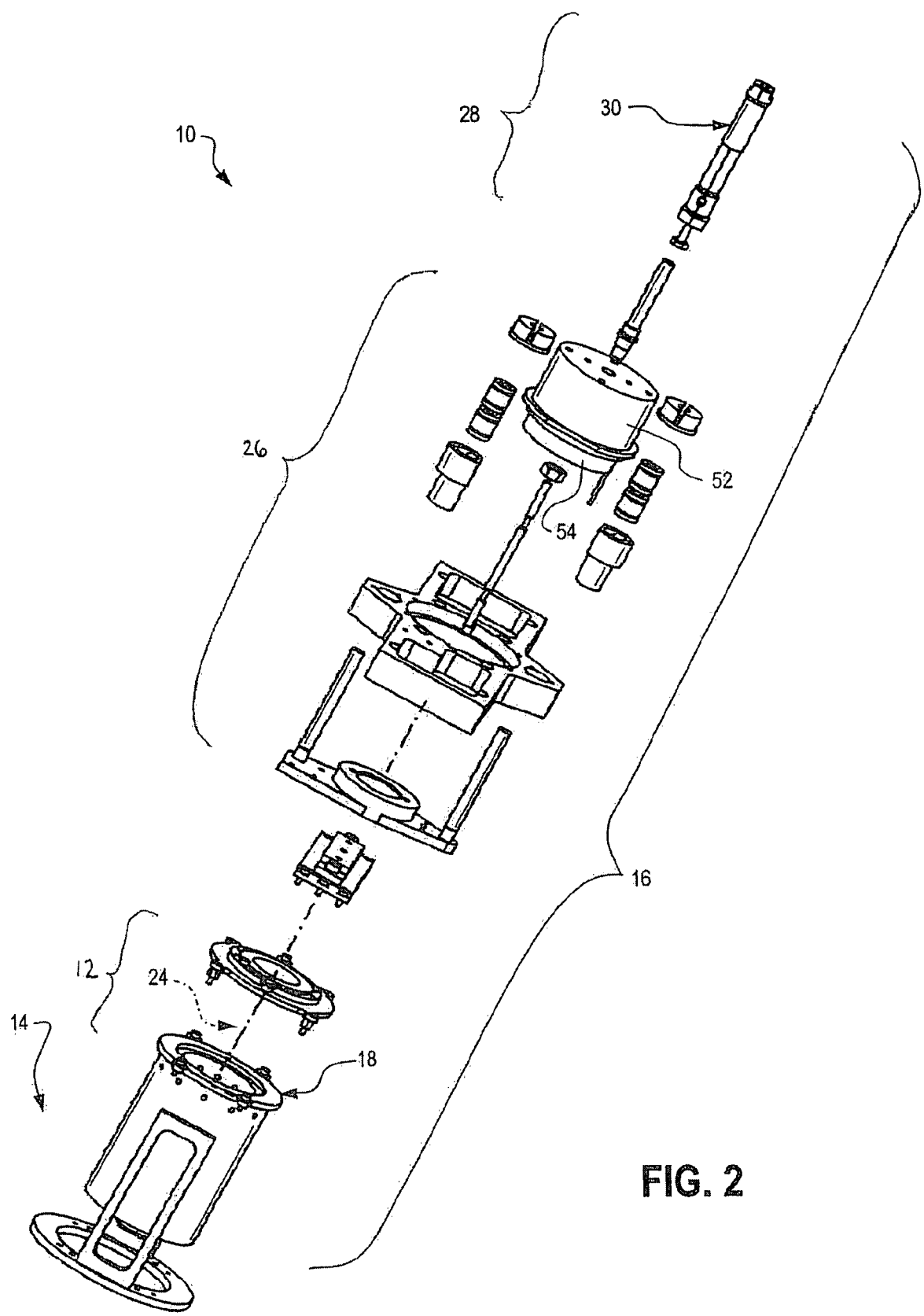
FIG. 2 is a simplified schematic view of a portion of an apparatus for processing an electronic component substrate having a laser lens suspended in static equilibrium by a fluid counterbalance according to an embodiment of the invention.

Referring now to FIGS. 1 and 2, by way of example and not limitation, an apparatus 10 is illustrated for supporting a portion 12 of a device 14 for processing an electronic component substrate, such as for forming a scribe on an electronic component substrate. The apparatus 10 includes an assembly 16 supporting a laser lens 18 in a gravity field 20 for focusing movement 22 with respect to the electronic component substrate along a Z-axis 24 by a linear actuator 26. A fluid counterbalance 28 for assembly 16 is defined by a fluid operated cylinder 30 having a piston 32 associated with a housing 34 for movement between end limits of travel 36, 38. The piston 32 divides the housing 34 into first and second fluid chambers 40, 42 having first and second fluid communication ports 44, 46 respectively. A fluid pressure source 48 is connectable to the first and second chambers 40, 42 through the first and second fluid communication ports 44, 46 respectively. The fluid pressure source 48 is adjustable through pressure regulators 48a, 48b in each supply line to communicate a different pressure on either side of the piston to statically suspend the supported laser lens 18 in equilibrium within the gravity field 20. The fluid pressure source permits movement of a mass associated with the supported lens 18 to any position between the opposite ends limits of travel 36, 38 of the piston 32 associated with the housing 34, while maintaining the mass of supported laser lens 18 in equilibrium.

The pressure within the first and second chambers 40, 42 is adjustable so the mass of the supported laser lens 18 is statically suspended in equilibrium within the gravity field 20. Adjusting pressure within the first and second chambers 40, 42 of the fluid operated cylinder 30 can move the supported laser lens 18 to any position within a range of travel of the piston 32 within the housing 34, while maintaining a mass of the supported laser lens 18 in equilibrium regardless of piston 32 position within the housing 34. A linear actuator 26 can be provided separate from the fluid pressure counterbalance 28 for moving the laser lens 18 to a desired position while statically balanced in equilibrium by the fluid pressure counterbalance 28. The fluid pressure counterbalance 28 can be operated with any desired fluid pressure. By way of example and not limitation, the fluid pressure counterbalance 28 can be a pneumatic counterbalance 28.

The fluid operated cylinder 30 can adjust damping of the supported laser lens 18 so that over-travel of the piston 32 and supported laser lens 18 after force is applied to the assembly 16 is minimized. A damping characteristic of the assembly 16 can be varied by changing an orifice size associated with at least one of the first and second communication ports 44, 46 of the fluid operated cylinder. If desired, an adjustable orifice 50 can be associated with each fluid communication port 44, 46 of the fluid operated cylinder 30 for varying a damping characteristic of the assembly 16, either manually or automatically.

The fluid operated cylinder 30 counterbalances a mass associated with the supported laser lens 18 in the gravity field 20 without lowering a natural frequency characteristic of the assembly 16. The fluid operated cylinder 30 counterbalances the mass of the supported laser lens 18 in the gravity field 20 without adding significant mass to the assembly 16. Fluid pressure can be applied separately through pressure regulators 48a, 48b in each supply line to equal forces on either side of the piston 32 to obtain a static equilibrium in the gravity field 20. A spring rate characteristic of the assembly 16 can be varied in response to a change of fluid pressure in at least one of the first and second chambers 44, 46 of the housing 34.

A method for supporting an assembly 16 including a laser lens 18 in a gravity field 20 for focusing movement 22 with respect to an electronic component substrate along a Z-axis 24 by a linear actuator 26 in an apparatus 10 for processing the electronic component substrate, such as for forming a scribe on the electronic component substrate, can include providing a fluid counterbalance 28 for the assembly 16. The assembly 16 can be defined by a fluid operated cylinder 30 having a piston 32 associated with housing 34 for reciprocal movement between opposite end limits of travel 36, 38. The piston 32 divides the cylinder 30 into first and second chambers 40, 42 having first and second fluid communication ports 44, 46 respectively. The method can include connecting a fluid pressure source 48 to the first and second chambers 40, 42 through separate pressure regulators 48a, 48b in each supply line connected to the corresponding first and second fluid communication ports 44, 46. The method can also include adjusting the fluid pressure source 48, automatically or manually, with the pressure regulators 48a, 48b to statically suspend the supported laser lens 18 in equilibrium within the gravity field 20. The fluid pressure source 48 acting through pressure regulators 48a, 48b can permit movement of a mass of the supported laser lens 18 to any position between opposite end limits of travel 36, 38 of the piston 32 associated with the housing 34, while maintaining the mass of the supported laser lens 18 in equilibrium. The fluid pressure source can be a gas system or a liquid system. By way of example and not limitation, the fluid pressure source 48 can be a pneumatic system, hydraulic system, or any desired gas or liquid medium suitable for the particular application. Pneumatic systems are commonly available, and suitable for most processing operations in electronic component equipment applications.

In operation, the method can adjust the fluid pressure source 48, acting through separate pressure regulators 48a, 48b in communication with the fluid operated cylinder 30 through corresponding ports 44, 46, to statically suspend the mass of the supported laser lens 18 in equilibrium within the gravity field 20. Adjusting the fluid pressure source 48, through separate pressure regulators 48a, 48b in each supply line to communicate different pressure on either side of the piston through corresponding ports 44, 46 in communication with the fluid operated cylinder 30, can move the supported laser lens 18 to any position within a range of travel 36, 38 of the piston 32 within the housing 34, while maintaining a mass of the supported laser lens 18 in equilibrium regardless of piston 32 position within the housing 34. The laser lens 18 can be moved either in response to fluid pressure changes, or as a result of external driving forces from a linear actuator 26 separate from the fluid operated cylinder 30, while the fluid operated cylinder 30 maintains the mass of the supported laser lens 18 in equilibrium permitting lower power requirements for generation of the external driving force. The linear actuator 26, by way of example and not limitation, can be formed as a voice coil magnet 52 and voice coil windings 54. Equalizing forces due to fluid pressure on either side of piston 32 permits the assembly 16 to obtain static equilibrium of the supported laser lens 18 in the gravity field 20.

Adjusting the fluid pressure source 48 through pressure regulators 48a, 48b in communication with the fluid operated cylinder 30 can adjust a damping characteristic of the supported laser lens 18 so that over-travel of the assembly 16 supporting the laser lens 18 after force is applied to the assembly 16 is minimized. In operation, the method can vary a damping characteristic of the assembly 16 by changing a size of an orifice 50 associated with at least one of the first and second communication ports 44, 46 of the fluid operated cylinder 30. Adjusting an orifice 50 associated with each fluid communication port 44, 46 of the fluid operated cylinder 30 can also vary a damping characteristic of the assembly 16.

Adjusting the fluid pressure source 48 through pressure regulators 48a, 48b in communication with the fluid operated cylinder 30 counterbalances a mass associated with the supported laser lens 18 in the gravity field 20 without lowering a natural frequency characteristic of the assembly 16. The fluid pressure source 48 adjustment through pressure regulators 48a, 48b in communication with the fluid operated cylinder 30 can counterbalance a mass of the supported laser lens 18 in the gravity field 20 without adding significant mass to the assembly 16. A spring rate characteristic of the assembly 16 can be varied in response to a change in pressure in at least one of the first and second chambers 40, 42 of the assembly 16.

The present invention has been described with respect to processing an electronic component substrate, by way of example and not limitation, such as forming a scribe on an electronic component substrate. The drawings have been simplified in order to illustrate the portion of the scribe forming equipment in direct interaction with the fluid counterbalance 28 for the assembly 16. Other portions of the scribe forming equipment and the operation of the scribe forming equipment can be conventional known configurations, for example as illustrated in U.S. Pat. No. 6,949,449; International Publication No. WO 2005/008849 A2; U.S. Published Patent No. US 2005/0042805 A1; and U.S. Patent Publication No. US 2007/0050075 A1, all of which are incorporated herein by reference in their entirety. Other known scribe forming equipment and processes can be seen in U.S. Pat. No. 5,961,852; and International Publication No. WO 2006/088991 A2, which are incorporated by reference herein in their entirety. It should also be recognized that the fluid counterbalance 28 as disclosed herein can be used in combination with other equipment where a laser lens is supported in a gravity field for focusing movement with respect to a workpiece, such as an electronic component substrate.

In operation, opposing fluid pressures P1 and P2 in a cylinder are adjusted to that the supported mass is statically suspended in equilibrium in the gravity field, where (P1*A1)−(P2*A2)=(MASS*GRAVITY), where P1 is the pressure in the first chamber and A1 is the surface area of the piston in the first chamber, P2 is the pressure in the second chamber and A2 is the surface area of the piston in the second chamber, MASS is the weight of the assembly to be suspended in equilibrium, and GRAVITY is the known gravitational constant. The mass can be moved to any position within the range of travel of the piston 32 within the housing 34, and the mass is always in equilibrium regardless of where the point of rest of the piston 32 is. The damping of the system can be adjusted so that there is no over travel after the driving force is applied. By way of example and not limitation, one suitable application for the counterbalance apparatus 28 is for suspending a Z-axis assembly that uses a linear actuator. In short, the apparatus can eliminate the effect of gravity forces or spring forces that would act on the mass or force.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for processing an electronic component substrate using a laser lens, the apparatus comprising:
   a linear actuator moving the laser lens along a Z-axis to a desired position relative to the electronic component substrate, the linear actuator including a coil winding and a magnet;
   a fluid counterbalance supporting the laser lens and defined by a fluid operated cylinder having a piston associated with a housing for movement between end limits of travel, the piston dividing the housing into first and second fluid chambers having first and second fluid communication ports respectively, the fluid counterbalance responsive to movement of the linear actuator; and
   a fluid pressure source connectable to the first and second chambers through the first and second fluid communication ports respectively, the fluid pressure source adjustable to suspend the laser lens in equilibrium to any position associated with opposite end limits of travel of the piston associated with the housing.

2. The apparatus of claim 1, wherein pressure within the first and second chambers of the fluid operated cylinder is adjustable so that a mass of the laser lens is suspended in equilibrium.

3. The apparatus of claim 1, wherein varying pressure within the first and second chambers of the fluid operated cylinder can move the laser lens to any position within a range of travel of the piston within the housing, while maintaining a mass of the laser lens in equilibrium regardless of piston position within the housing.

4. The apparatus of claim 1, wherein the fluid operated cylinder adjusts damping of the laser lens so that over-travel after force is applied is minimized.

5. The apparatus of claim 1, wherein the fluid operated cylinder counterbalances a mass of the laser lens without lowering a natural frequency characteristic of the assembly.

6. The apparatus of claim 1, wherein the fluid operated cylinder counterbalances a mass of the laser lens without adding significant mass.

7. The apparatus of claim 1, wherein a damping characteristic of the assembly varies by changing an orifice size associated with at least one of the first and second fluid communication ports of the fluid operated cylinder.

8. The apparatus of claim 1, wherein a spring rate characteristic of the assembly varies in response to a change of pressure in at least one of the first and second chambers of the housing.

9. The apparatus of claim 1, wherein pressure is equalized on either side of the piston to negate an effect of gravity on a mass of the laser lens.

10. The apparatus of claim 1 further comprising:
    an adjustable orifice associated with each fluid communication port of the fluid operated cylinder for varying a damping characteristic of the assembly.

11. The apparatus of claim 1, wherein the fluid counterbalance adjusts the relative size of the first and second fluid chambers to negate an effect of gravity on a mass of the laser lens.

12. A method for processing an electronic component substrate using a laser lens, the method comprising:
    adjusting a fluid pressure source to suspend the laser lens in equilibrium to a position between opposite end limits of travel of a piston associated with a housing based on a mass of the laser lens and gravity, the piston and the housing comprising a fluid operated cylinder of a fluid counterbalance, the piston dividing the cylinder into first and second chambers having first and second fluid communication ports respectively and the fluid pressure source connected to the first and second chambers through the first and second fluid communication ports respectively; and
    actuating movement of the laser lens along a Z-axis to a desired position relative to the electronic component substrate with a linear actuator after adjusting the fluid pressure source, the linear actuator including a coil winding and a magnet;
    and wherein the fluid counterbalance is responsive to the movement of the linear actuator.

13. The method of claim 12, wherein adjusting the fluid pressure source moves the laser lens to any position within a range of travel of the piston within the housing, while maintaining the mass of the laser lens in equilibrium regardless of piston position within the housing.

14. The method of claim 12, wherein adjusting the fluid pressure source in adjusts damping of the laser lens so that over-travel after force is applied is minimized.

15. The method of claim 12, wherein adjusting the fluid pressure source counterbalances the mass of the laser lens without lowering a natural frequency characteristic of the laser lens.

16. The method of claim 12, wherein adjusting the fluid pressure source counterbalances the mass of the laser lens without adding significant mass.

17. The method of claim 12 further comprising:
    varying a damping characteristic of the assembly by changing an orifice size associated with at least one of the first and second fluid communication ports of the fluid operated cylinder.

18. The method of claim 12 further comprising:
    equalizing pressure on either side of the piston to obtain equilibrium of the laser lens by adjusting the relative size of the first and second chambers to negate an effect of gravity on the mass of the laser lens.

19. The method of claim 12 further comprising:
    adjusting an orifice associated with each fluid communication port of the fluid operated cylinder for varying a damping characteristic of the assembly.

20. The method of claim 12 wherein the piston of the fluid counterbalance is coupled to the coil winding for the linear movement with the linear actuator.

* * * * *